United States Patent
Crocker et al.

(10) Patent No.: US 6,351,454 B1
(45) Date of Patent: Feb. 26, 2002

(54) APPARATUS AND METHOD FOR MAINTAINING PACKET ORDERING OVER PARALLEL LINKS OF A CROSSBAR BASED SWITCH FABRIC

(75) Inventors: Daniel W. Crocker; Daniel Yu Kwong Ng, both of San Jose, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/122,418

(22) Filed: Jul. 24, 1998

(51) Int. Cl.⁷ ............................................. H04L 12/56
(52) U.S. Cl. ...................... 370/235; 370/394; 370/428; 709/232
(58) Field of Search ................................ 370/394, 401, 370/412, 428, 429, 230, 231, 233, 234, 235; 709/232, 233, 213, 214, 215

(56) References Cited

U.S. PATENT DOCUMENTS

| | | | |
|---|---|---|---|
| 4,532,626 A | 7/1985 | Flores et al. ................. 370/85 |
| 5,088,032 A | 2/1992 | Bosack ........................ 395/200 |
| 5,115,431 A | 5/1992 | Williams et al. ............ 370/94.1 |
| 5,122,691 A | 6/1992 | Balakrishnan ............... 307/475 |
| 5,249,178 A | 9/1993 | Kurano et al. ............... 370/60 |
| 5,253,251 A | * 10/1993 | Aramaki ..................... 370/394 |
| 5,260,933 A | 11/1993 | Rouse ......................... 370/14 |
| 5,260,978 A | 11/1993 | Fleischer et al. ........... 375/106 |
| 5,274,631 A | 12/1993 | Bhardwaj .................... 370/60 |
| 5,274,635 A | 12/1993 | Rahman et al. ............. 370/60.1 |
| 5,274,643 A | 12/1993 | Fisk ........................... 370/94.1 |
| 5,331,637 A | 7/1994 | Francis et al. ............... 370/54 |
| 5,339,311 A | 8/1994 | Turner ......................... 370/60 |
| 5,422,880 A | 6/1995 | Heitkamp et al. ........... 370/60 |
| 5,430,715 A | 7/1995 | Corbalis et al. ............. 370/54 |
| 5,548,729 A | 8/1996 | Akiyoshi et al. ........... 395/200.16 |
| 5,555,244 A | 9/1996 | Gupta et al. ................ 370/60.1 |
| 5,561,669 A | 10/1996 | Lenney et al. ............. 370/60.1 |
| 5,583,862 A | 12/1996 | Callon ......................... 370/397 |
| 5,617,417 A | 4/1997 | Sathe et al. ................. 370/394 |
| 5,648,970 A | * 7/1997 | Kapoor ....................... 370/394 |
| 5,712,854 A | * 1/1998 | Dieudonne et al. ........ 370/394 |
| 5,805,595 A | 9/1998 | Sharper et al. ............. 370/442 |
| 5,838,915 A | 11/1998 | Klausmeier et al. ...... 395/200.45 |
| 5,974,051 A | 10/1999 | De Nicolo et al. ......... 370/447 |

* cited by examiner

*Primary Examiner*—Ricky Ngo
(74) *Attorney, Agent, or Firm*—Thelen, Reid & Pries; David B. Ritchie

(57) ABSTRACT

A data exchange system includes at least one transmitting agent, at least one receiving agent, and a plurality of data links each having a crossbar coupling respective transmitting agents and receiving agents. A stream of data packets including at least one Order Critical Flow of data packets having a critical order to be sent from the transmitting agent to the receiving agent is divided for transmission among the plurality of data links. Multiple Order Critical Flows between the transmitting agent and the receiving agent are possible and the packets within such Order Critical Flows can be intermixed for transmission (along with packets from other Non-Order Critical Flows). The packets are transmitted over the data links so that packets from the same Order Critical Flow are transmitted over the same data link (while packets from that Order Critical Flow are in the Transmit Link Queue) and the packets are sequentially numbered, based upon the time when the packet was first received (and not the link over which the packet was received) upon the beginning of receipt by the receiving agent and reassembled by the receiving agent into a stream of data packets in accordance with the numbering sequence, thus maintaining the order of all Order Critical Flows.

14 Claims, 3 Drawing Sheets

APPARATUS AND METHOD FOR MAINTAINING PACKET ORDERING OVER PARALLEL LINKS OF A CROSSBAR BASED SWITCH FABRIC

BACKGROUND OF THE INVENTION

1. Field of the Invention

This invention relates generally to the field of data exchange. More specifically, this invention relates to data exchange among a plurality of agents using a plurality of data links, each data link passing through or including a crossbar.

2. Background

Those of ordinary skill in the art will realize that, in its most basic form, data exchange can represent the transfer of data of a communication from a transmitting agent to a receiving agent over a single dedicated data link. In a slightly more complicated form, data exchange can represent the transfer of data from agent A to agent B over dedicated data link 1 and the transfer of data from agent B to agent A over dedicated data link 2. Alternatively, data exchange can represent the transfer of data from agent A to agent B over a dedicated data link at time 1 and the transfer of data from agent B to agent A over the same dedicated data link at time 2 where time 1 and time 2 are different times such that the two transmissions do not conflict with one another. In its most abstract form, data exchange can represent the transfer of data from n transmitting agents to n receiving agents over n data links where n is an positive integer. As the number of agents and data links grows, the complexity and cost of the data exchange system can become extreme.

One method for simplifying the data exchange system is to combine the data links rather than have separate links between each of the agents. This can be accomplished by connecting each of the agents only to a common point or crossbar (XBAR) which connects the agents two at a time as appropriate to complete the data link between the agents. This method benefits from a reduction in the number of data links in the data exchange system but suffers from an increase in traffic over each of the data links. Those of ordinary skill in the art will realize that each of the data links has a limited bandwidth depending on the transmission media. Eventually, each of the data links will reach this limit and will not be able to transmit any more data at any faster speeds.

Some terminology which will be used herein will now be set forth. The term "Switch Fabric" describes a plurality of Data Links interconnecting Agents through Packet Switching Crossbars ("XBARs"). The Switch Fabric can be constructed using one or more XBARs. Each "Agent" can transmit or receive data over the Switch Fabric. An Agent which is involved in a data transfer in which it is transmitting is called the "Transmitting Agent". Likewise, an Agent which is involved in a data transfer in which it is receiving is called the "Receiving Agent". Agents and XBARs connect to Data Links using "Data Link Ports". An Agent has as many Data Link Ports as there are XBARs in the system. An XBAR has as many Data Link Ports as there are Agents in the system.

The data which is transferred between Agents is called a "Stream of Packets" and each of the packets will be of arbitrary size. The Stream of Packets is comprised of one or more "Flows". A "Flow" is a group of packets that are related, i.e., they are commonly addressed. An "Order Critical Flow" is a Flow which is order sensitive, i.e., the order of this group of packets needs to be maintained when being transferred over the Switch Fabric. Such order must be maintained, for example, in voice over packet communications and video over packet communications, to name two examples.

Each Transmitting Agent keeps a queue of packets to be transmitted in a Transmit Queue ("TQ") or transmit buffer. Each Transmitting Agent keeps queues of packets for each Data Link of the Switch Fabric. These are called Transmit Link Queues ("TLQs"). A Transmitting Agent's packets to be transmitted are removed from its TQ and assigned to its plurality of TLQs and then transmitted over the Data Link(s).

Each Receiving Agent keeps a queue of packets received from each Data Link of the Switch Fabric. These are called Receive Link Queues ("RLQs"). Each Receiving Agent keeps a queue of packets received in a Receive Queue ("RQ") or receive buffer. A Receiving Agent's received packets are removed from its plurality of RLQs to its RQ as the received packets are received.

Packets which pass between agents across the switch fabric can be separated into two groups: those for which order must be maintained and those whose order can be modified by the switch fabric. As was previously mentioned, the former group is defined to be an Order Critical Flow while the latter is defined simply as a Flow. There are numerous reasons why an Order Critical Flow might exist in a system. One might be that the flow is comprised of packets of digitized video or audio. In this case, it is highly desirable to keep all packets of this flow in sequential order. Out of order packets would introduce distortions in what is supposed to approximate a continuous signal. This is just one example of an Order Critical Flow; there are many others. The present invention addresses the issue of maintaining packet ordering for Order Critical Flows regardless of the reason for the requirement for preservation of packet order.

SUMMARY OF THE INVENTION

A data exchange system includes at least one transmitting agent, at least one receiving agent, and a plurality of data links each having a crossbar coupling respective transmitting agents and receiving agents. A stream of data packets including at least one Order Critical Flow of data packets having a critical order to be sent from the transmitting agent to the receiving agent is divided for transmission among the plurality of data links. Multiple Order Critical Flows between the transmitting agent and the receiving agent are possible and the packets within such Order Critical Flows can be intermixed for transmission (along with packets from other Non-Order Critical Flows). The packets are transmitted over the data links so that packets from the same Order Critical Flow are transmitted over the same data link (while packets from that Order Critical Flow are in the Transmit Link Queue) and the packets are sequentially numbered, based upon the time when the first byte of the packet was received (and not the link over which the packet was received) and reassembled by the receiving agent into a stream of data packets in accordance with the numbering sequence, thus maintaining the order of all Order Critical Flows.

OBJECTS AND ADVANTAGES OF THE INVENTION

Accordingly, it is an object and advantage of the present invention to provide a method and apparatus for data exchange that exhibits improved data exchange system bandwidth.

It is another object and advantage of the present invention to provide increased Switch Fabric bandwidth by allowing the use of multiple parallel Data Links for packet transfer in circumstances where the order of some (but not all) packets is critical.

It is another object and advantage of the present invention to provide an economical high speed parallel data link.

It is another object and advantage of the present invention to take advantage of the fact that not all flows of packets sent over the data exchange system will be Order Critical Flows and thereby to maximize the useable bandwidth of the Switch Fabric by passing such Non-Order Critical Flows of packets through Parallel Data Links simultaneously with packets from Order Critical Flows queued for transmit over a selected Data Link.

It is another object and advantage of the present invention to process received packets at the Receiving Agent in the sequential order in which they were initially received in order to provide a simple method for allocating processing resources to individual Data Links while achieving the goal of maintaining the order of Order Critical Flows.

It is another object and advantage of the present invention that the use of Multiple Data Links to communicate between Transmitting Agents and Receiving Agents provides a measure of redundancy to the communications system.

These and many other objects and advantages of the present invention will become apparent to those of ordinary skill in the art from a consideration of the drawings and ensuing description of the invention.

DESCRIPTION OF THE PREFERRED EMBODIMENTS

Those of ordinary skill in the art will realize that the following description of the present invention is illustrative only and is not intended to be in any way limiting. Other embodiments of the invention will readily suggest themselves to such skilled persons from an examination of the within disclosure.

In the field of data exchange, those of ordinary skill in the art will realize that the data may take many forms. In the present computer age, data is often either original analog data converted to digital data or original digital data. Digital data consists of a series of bits that encode the information. The bits are organized into strings of bits. Four bits is referred to as a nibble. Eight bits is referred to as a byte. A string of bytes of indefinite length is referred to as a packet.

Those of ordinary skill in the art will realize that there are instances when the packets of a particular communication are order sensitive. This means that a data exchange system cannot mix up the order of these packets without disrupting or even destroying the Order Critical Flow. An example would be a video flow. If a video flow is broken into sequential packets and the data exchange system disrupts the sequence of those packets prior to receipt, then the video flow received by the receiving agent will not be continuous or may be distorted. This result should be avoided. Despite being order sensitive, the video flow does not have to be transmitted one packet after another with no interruptions. It is possible for the data exchange system to intermix a multitude of packet flows, both Order Critical and Non-Order Critical, so long as the order of Order Critical Flows is not corrupted.

Order Critical Flows may be designated in any of a number of ways, as would be apparent to those of ordinary skill in the art. For example, their packets may carry information in a packet header associating the packets with a particular Order Critical Flow, e.g., a flow identifier serial number. Those packets lacking this identifier would be packets of a Non-Order Critical Flow, or other packets.

Figure 1:
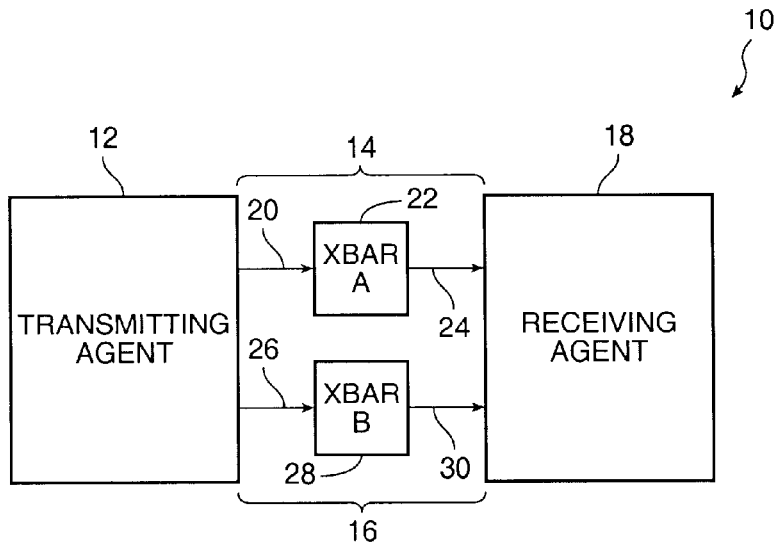
FIG. 1 is a block diagram of a data exchange system in accordance with a presently preferred embodiment of the present invention.

Turning first to FIG. 1, a block diagram of a data exchange system 10 according to a presently preferred embodiment of the present invention is shown. The data exchange system 10 includes a Transmitting Agent 12, a first Data Link 14, a second data link 16, and a Receiving Agent 18. The first Data Link 14 includes a first line 20, XBAR A 22, and a second line 24. The second Data Link 16 includes a first line 26, XBAR B 28, and a second line 30. It is important to note that the data exchange system 10 shown is of minimum complexity for example purposes only. Those of ordinary skill in the art will realize that the invention disclosed herein would apply equally well to a data exchange system having more than one Transmitting Agent, more than two XBARS, and more than one Receiving Agent. More often than not, a typical application of the present invention would involve a more complex data exchange system than that shown but each individual exchange of data could ultimately be broken down into components just like the data exchange system 10 shown.

The data exchange system 10 of the present invention exhibits improved data exchange system bandwidth through the use of two Data Links, first Data Link 14 and second Data Link 16, respectively, rather than a Single Data Link, as in the prior art. Even greater data exchange system bandwidth could be achieved through the use of more than two Data Links. One potential drawback to the use of multiple Data Links is that if the data exchange system is not properly designed, the use of multiple links may result in the disruption of the sequence of packets of an Order Critical Flow. For example, with reference to FIG. 1, suppose that a first packet of a first Order Critical Flow (i.e. flow 1;1) is sent by the Transmitting Agent 12 on the first Data Link 14, a second packet of the same Order Critical Flow (i.e. flow 1;2) is sent on the second Data Link 16, and that the transmission time is longer for flow 1;1 than it is for flow 1;2, then flow 1;2 would arrive at the Receiving Agent 18 before flow 1;1. Depending upon how the stream of packets is reconstructed at the Receiving Agent 18, this could result in distortion—i.e., the resulting stream of packets would have lost its order, as would Order Critical Flow No. 1.

This potential drawback is avoided in the present invention through the application of a pair of operating rules. The first rule controls the movement of packets from the TQ to the TLQs. In general, packets are distributed evenly between TLQs except when the packet to be moved belongs to the same Order Critical Flow as a packet already waiting for transmit in one of the TLQs. In this case, the packet must be placed in the TLQ which contains the packet from the same Order Critical Flow. Examples of the application of this rule will be presented with respect to FIGS. 2 and 3 below. The second rule controls the movement of packets from the RLQs to the RQ. Packets are moved from the RLQs to the RQ in sequential order as initially received by the Receiving Agent. An example of the application of this rule will be presented with respect to FIGS. 4 and 5 below. In accordance with a presently preferred embodiment of the present invention, the first rule is implemented by the Transmitting Agent 12 and the second rule is implemented by the Receiving Agent 18. The result is a distributed responsibility data exchange system 10 with no reliance on the coordination of the first and second Data Links (14 and 16 respectively) themselves or between the transmitting and receiving agent.

Figure 2:
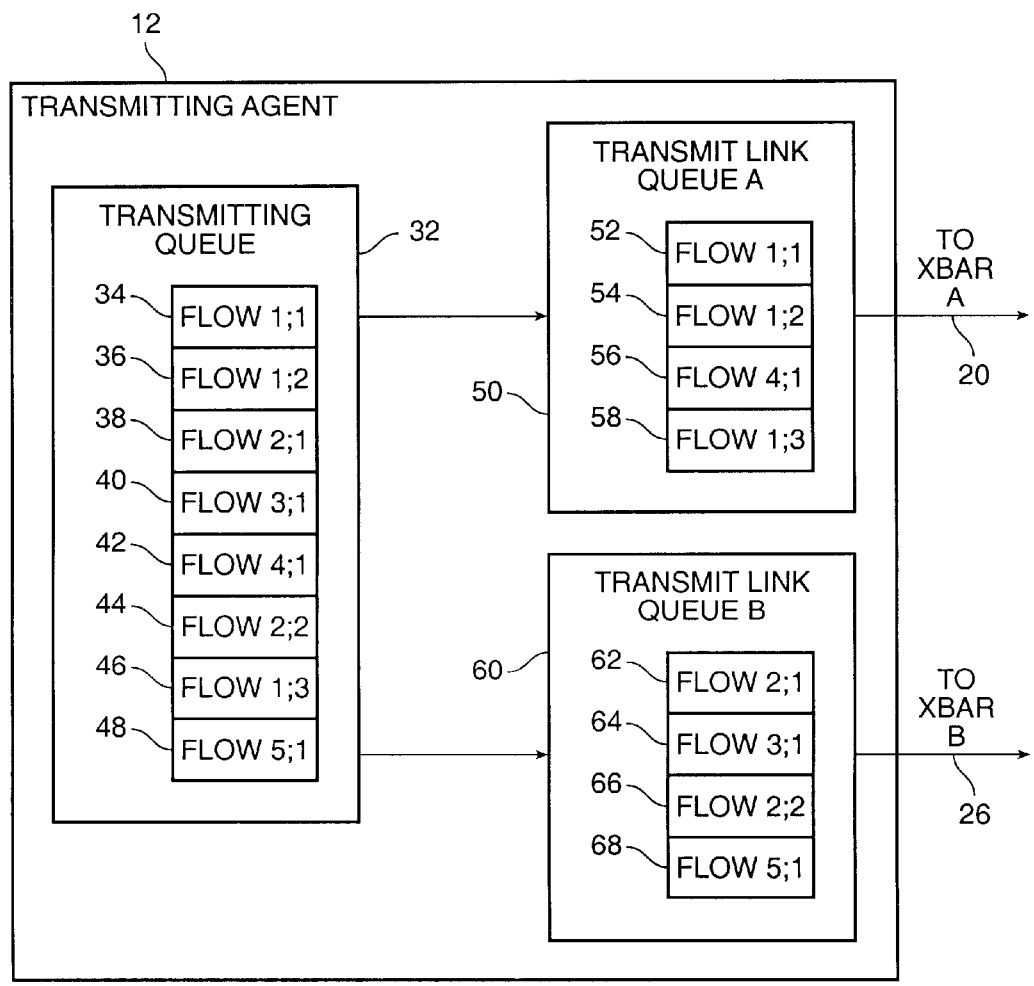
FIG. 2 is a block diagram of a Transmitting Agent showing a first example of data transmission in accordance with a presently preferred embodiment of the present invention.

Turning now to FIG. 2, a block diagram of the Transmitting Agent 12, and lines 20 and 26 to XBAR A 22 and XBAR B 28, respectively, illustrating a first example of data transmission according to the first rule of the present invention is shown. Data that is ready for transmission is located in Transmitting Queue 32 of Transmitting Agent 12. Transmitting Queue 32 is shown in FIG. 2 to have eight separate packet memories 34, 36, 38, 40, 42, 44, 46, and 48, respectively, however those of ordinary skill in the art will realize that any number of such memories could be employed in a similar manner as described herein for eight memories. Also, the memories can be of any length but must be at least as long as the longest packet to be encountered.

Packets that are to be transmitted over the first Data Link 14 (FIG. 1) are first placed in Transmit Link Queue A ("TLQA") 50 of Transmitting Agent 12. TLQA 50 has a number of packet memories 52, 54, 56, 58 which serve to buffer packets to be sent by TLQA over first Data Link 14. Those of ordinary skill in the art will realize that any number of such packet memories could be used and that they should be adapted to store the longest packet to be encountered.

Packets that are to be transmitted over the second Data Link 16 (FIG. 1) are similarly placed in Transmit Link Queue B ("TLQB") 60 of Transmitting Agent 12. TLQB has a number of packet memories 62, 64, 66, 68 which serve to buffer packets to be sent by TLQB over second Data Link 16. Those of ordinary skill in the art will realize that any number of such packet memories could be used and that they should be adapted to store the longest packet to be encountered.

Recall the first rule from above. Suppose, for example, that five different data flows are ready for transmission and that their respective packets are loaded into Transmitting Queue 32 as shown in FIG. 2. For reference, the notation of flow 3;1 entered in memory 40 of Transmitting Queue 32 should be interpreted as being the first packet of flow three and the others should be interpreted likewise. We will also suppose that all five flows are Order Critical Flows.

Applying this first rule to memory 34 of Transmitting Queue 32, one finds that flow 1 is not currently being transmitted on either of the first or the second Data Links 14 and 16 so one can choose either. For convenience, flow 1;1 is chosen to be transmitted over the first Data Link 14 and is therefore shown stored in memory 52 of TLQA 50. Next, applying this first rule to memory 36, one finds that flow 1 is currently being transmitted over the first Data Link 14, so flow 1;2 must be transmitted over the first data link 14 as well and is therefore shown stored in memory 54 of TLQA 50. Next, applying the first rule to memory 38, one finds that flow 2 is not currently being transmitted on either of the first or the second Data Links 14 and 16 so one can choose either. For bandwidth allocation reasons however, flow 2;1 is chosen to be transmitted over the second Data Link 16 because its Transmit Link Queue (TLQB) is less full and the packet is therefore shown stored in memory 62 of TLQB 60. Next, applying rule one to memory 40, one finds that flow 3 is not currently being transmitted on either of the first or the second Data Links 14 and 16 so one can choose either. For bandwidth allocation reasons however, flow 3;1 is chosen to be transmitted over the second Data Link 16 because its Transmit Link Queue (TLQB) is less full and the packet is therefore shown stored in memory 64 of TLQB 60. Next, applying rule one to memory 42, one finds that flow 4 is not currently being transmitted on either of the first or the second data links 14 and 16 so one can choose either. Because now both Data Link Queues are equally full, for convenience, flow 4;1 is chosen to be transmitted over the first Data Link 14 and is therefore shown stored in memory 56 of TLQA 50. Next, applying rule one to memory 44, one finds that flow 2 is currently being transmitted over the second Data Link 16, so flow 2;2 must be transmitted over the second Data Link 16 as well and is therefore shown stored in memory 66 of TLQB 60. Next, applying rule one to memory 46, one finds that flow 1 is currently being transmitted over the first Data Link 14, so flow 1;3 must be transmitted over the first Data Link 14 as well and is therefore shown stored in memory 58 of TLQA 50. Finally, applying rule one to memory 48, one finds that flow 5 is not currently being transmitted on either of the first or the second Data Links 14 and 16 so one can choose either. For bandwidth allocation reasons however, flow 5;1 is chosen to be transmitted over the second Data Link 16 because its Transmit Link Queue (TLQB) is less full and the packet is therefore shown stored in memory 68 of TLQB 60. This process is repeated as memories become available in Transmitting Queue 32, TLQA 50, and TLQB 60 while data is being exchanged.

This first example of data transmission according to the first rule of the present invention as in FIG. 2 shows the desired full bandwidth allocation. That is, eight packets of transmitted data are equally split into two queues of four each for each Data Link. This however will not always be the case.

Figure 3:
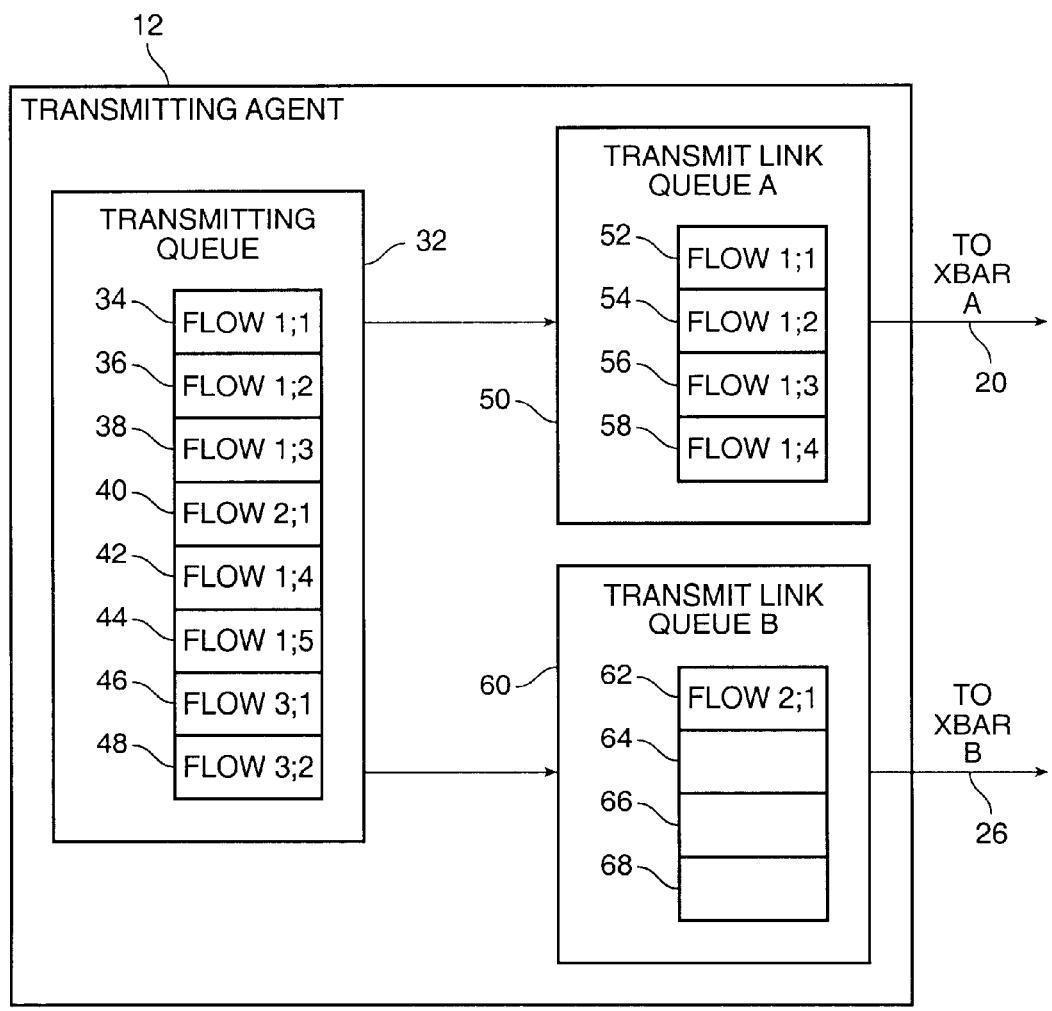
FIG. 3 is a block diagram of a Transmitting Agent showing a second example of data transmission in accordance with a presently preferred embodiment of the present invention.

Turning now to FIG. 3, a block diagram of the Transmitting Agent 12, and lines 20 and 26 to Xbar A 22 and Xbar B 28, respectively, illustrating a second example of data transmission according to the first rule of the present invention is shown. Suppose for example that three different Order Critical Flows of data are ready for transmission and that their respective packets are loaded into the Transmitting Queue 32 as shown in FIG. 3. The application of rule one in this case will result in an unequal allocation of bandwidth.

Applying rule one to memory 34, one finds that flow 1 is not currently being transmitted on either of the first or the second Data Links 14 and 16 so one can choose either. For convenience, flow 1;1 is chosen to be transmitted over the first Data Link 14 and is therefore shown stored in memory 52 of TLQA 50. Next, applying rule one to memory 36, one finds that flow 1 is currently being transmitted over the first data link 14, so flow 1;2 must be transmitted over the first Data Link 14 as well and is therefore shown stored in memory 54 of TLQA 50. Next, applying rule one to memory 38, one finds that flow 1 is currently being transmitted over the first Data Link 14, so flow 1;3 must be transmitted over the first Data Link 14 as well and is therefore shown stored in memory 56 of TLQA 50. Next, applying rule one to memory 40, one finds that flow 2 is not currently being transmitted on either of the first or the second Data Links 14 and 16 so one can choose either. For bandwidth allocation reasons however, flow 2;1 is chosen to be transmitted over the second Data Link 16 because its Transmit Link Queue (TLQB) is less full and the packet is therefore shown stored in memory 62 of TLQB 60. Next, applying rule one to memory 42, one finds that flow 1 is currently being transmitted over the first Data Link 14, so flow 1;4 must be transmitted over the first Data Link 14 as well and is therefore shown stored in memory 58 of TLQA 50.

Next, applying rule one to memory 44, one finds that flow 1 is currently being transmitted over the first Data Link 14, so flow 1;5 must be transmitted over the first Data Link 14 as well, however TLQA 50 is currently full. As a consequence of rule one, flow 1;5 must wait for a space to open in TLQA 50. Flow 1;5 is not allowed to transmit over the second Data Link 16. The result is an unequal allocation of bandwidth. Nevertheless, since having two Data Links is better than having only one Data Link, this unequal allocation of bandwidth proves to be an advance over the prior art. As compared to a single Data Link data exchange system, even in this situation, the data exchange system 10 of the present invention actually transmitted one more packet (i.e. five versus four) than the single Data Link system would have given the same set of data to transmit. Since the transmission times are relatively short, it is presently preferred to have the data exchange system 10 wait for space to open up in TLQA 50 for the transmission of flow 1;5 without the data exchange system 10 looking ahead to memory 46 of Transmitting Queue 32 for possible transmission on data link 16, although this would be possible at the cost of some added system complexity.

It should be noted that if flow 1;5 had become ready for transmission at some time after all of flows 1;1, 1;2, 1;3, and 1;4 had left TLQA 50, then flow 1;5 could once again be transmitted on either of the first or the second Data Links 14 and 16, so one can choose either. A packet is considered to have "left" a TLQ when the last data of the packet has been transmitted over the Data Link. Thus, the result of unequal allocation of bandwidth depends on when the data becomes ready for transmission. This case also demonstrates that it is not necessary that all packets of an Order Critical Flow travel over a particular Data Link—just that they all do so as long as such related packets are in one of the TLQs of the Transmitting Agent 12. The possibility of data packet scrambling introduced by this fact is resolved by the packet sequence labeling discussed below.

Figure 4:
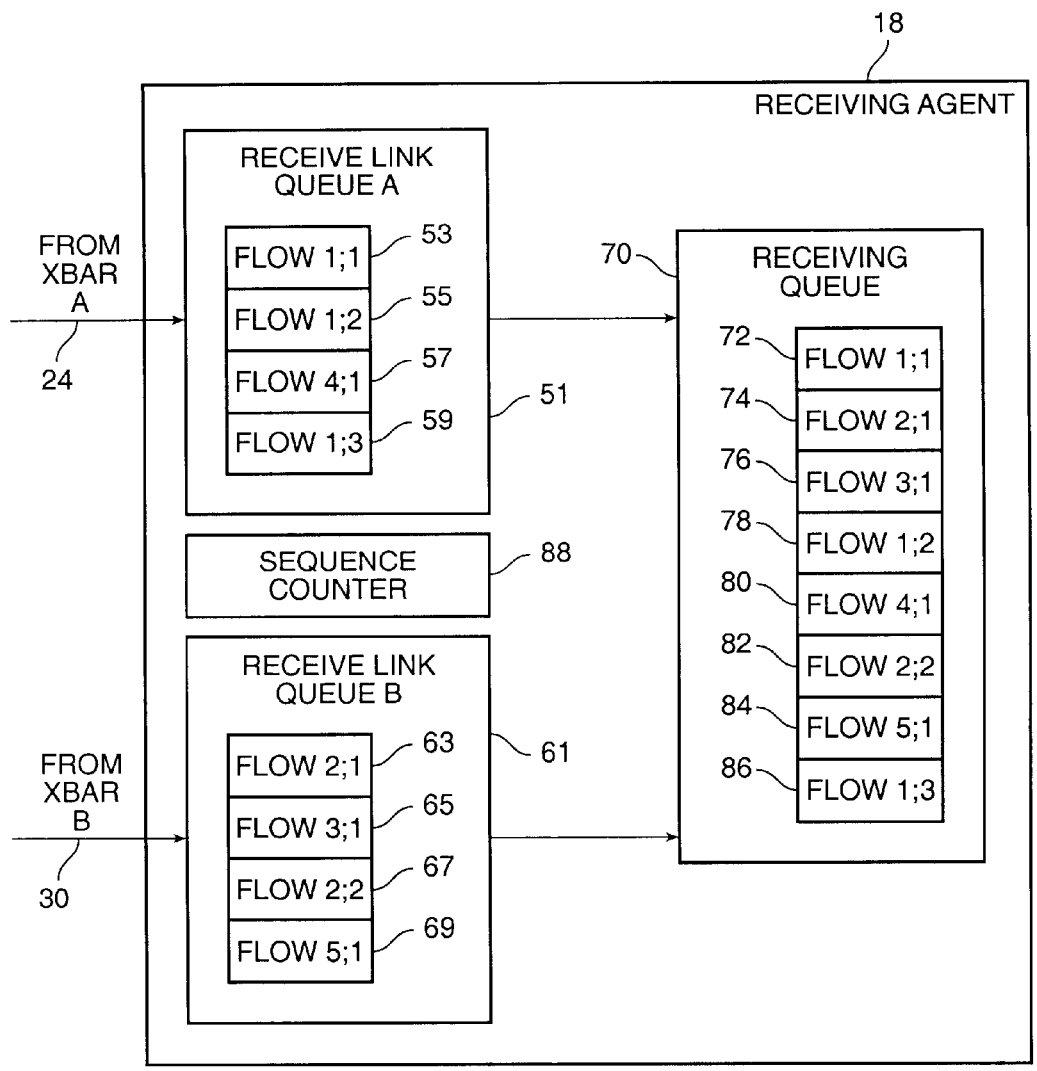
FIG. 4 is a block diagram of a Receiving Agent showing an example of data reception in accordance with a presently preferred embodiment of the present invention.

Turning now to FIG. 4, a block diagram of line 24 from XBAR A 22, line 30 from XBAR B 28, and the Receiving Agent 18 illustrating an example of data reception according to the second rule of the present invention is shown. Data that has been initially received is located in RLQA 51 and in RLQB 61. Data that is transmitted over the first Data Link 14 is passed along the second line 24 to RLQA 51 of the receiving agent 18. Data that is transmitted over the second Data Link 16 is passed along the second line 30 to RLQB 61 of the Receiving Agent 18. In either case, the data is ultimately moved from RLQA 51 and RLQB 61 and stored in the Receiving Queue 70 of the Receiving Agent 18. Receiving Queue 70 is shown to have eight separate memories 72, 74, 76, 78, 80, 82, 84, and 86, respectively, however those of ordinary skill in the art will realize that any number of memories could be employed in a similar manner as described herein for eight memories. Also, the memories can be of any length but must be at least as long as the longest packet to be encountered. The order in which the data packets are stored in the Receiving Queue 70 (and ultimately used or retransmitted as a new stream of packets) depends on the application of the second rule as outlined above, and discussed in detail below.

Referring to FIGS. 1–4, Data Link 14 includes first line 20 communicating between TLQA 50 and XBAR A 22, XBAR A 22, and second line 24 communicating between XBAR A 22 and RLQA 51. Similarly, Data Link 16 includes first line 26 communicating between TLQB 60 and XBAR B 28, XBAR B 28, and second line 30 communicating between XBAR B 28 and RLQB 61. XBAR A 22 and XBAR B 28 are conventional high speed packet switching crossbars well known to those of ordinary skill in the art.

Recall from above that the second rule is that packets are processed by the Receiving Agent 18 in sequential order as received. In order to comply with the second rule, Receiving Agent 18 employs a sequence counter 88 to number the packets (as by inserting a sequence number in a header of the packet) based on the time at which they were first received. That is, the time at which the packet first arrives at Receiving Agent 18 and not the time at which packet reception is complete. The first packet to begin to arrive is number one, the second packet to begin to arrive is number two, and so on. The number given by sequence counter 88 does not depend on which Data Link the packet was received on. Since the packets are of various lengths, it is possible that while a long packet is being received on one Data Link, several shorter packets may be received on one or more other Data Links.

Suppose for example that five different Order Critical Flows of data packets have been received at RLQA 51 and RLQB 61 of Receiving Agent 18 as shown in FIG. 4. In order to apply the second rule to these data flows, the order in which each packet is received by Receiving Agent 18 must be known. Those of ordinary skill in the art will realize that the order of reception will depend at least upon the length of the packet and the speed of transmission over the Data Link.

Figure 5:
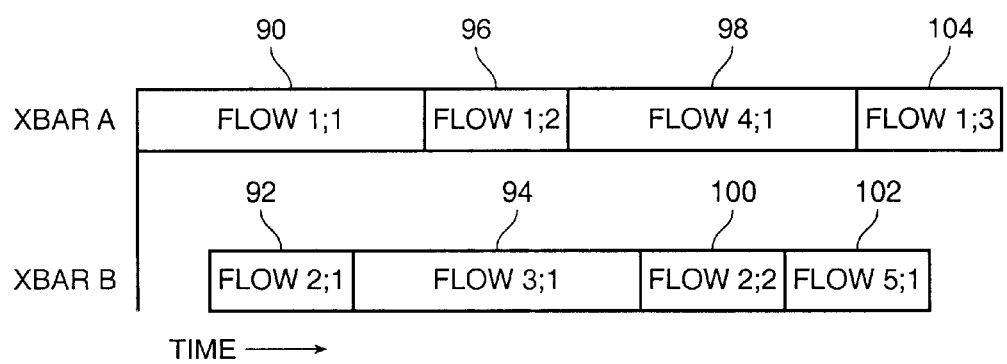
FIG. 5 is a graph of the data received over time by the Receiving Agent for the example shown in FIG. 4 in accordance with a presently preferred embodiment of the present invention.

Turning now to FIG. 5, a graph of the data received by the Receiving Agent 18 for the example shown in FIG. 4 according to the present invention is shown. In the graph, on the horizontal axis, time is increasing to the right. The horizontal width of the various bar segments (90, 92, 94, 96, 98, 100, 102, and 104) is representative of the time that each packet takes to transmit over the Data Link. As alluded to above, the horizontal width (time) will depend at least upon the length of the packet and the speed of transmission over the data link. Those of ordinary skill in the art will realize that the graph shows only a portion of what would be a continuous stream of data being transmitted over Data Links 14 and 16 and being received by Receiving Agent 18.

For this particular example, inspection of the graph will show that the first packet to be received by the Receiving Agent 18 of FIG. 4 is bar segment 90 representing flow 1;1. Bar segment 90 begins first in time at the left of the graph. Flow 1;1 was received through second line 24 from XBAR A 22 of first Data Link 14 of FIG. 4. As a result of being the first packet to be received by the Receiving Agent 18, the sequence counter 88 of FIG. 4 will number flow 1;1 as number one. The second packet to be received by the Receiving Agent 18 is bar segment 92 representing flow 2;1. Flow 2;1 was received through second line 30 from XBAR B 28 of second Data Link 16 of FIG. 4. The sequence counter 88 will number flow 2;1 as number two. The third packet to be received by the Receiving Agent 18 is bar segment 94 representing flow 3;1. The sequence counter 88 will number flow 3;1 as number three. The fourth packet to be received by the Receiving Agent 18 is bar segment 96 representing flow 1;2. The sequence counter 88 will number flow 1;2 as number four. The fifth packet to be received by the Receiving Agent 18 is bar segment 98 representing flow 4;1. The sequence counter 88 will number flow 4;1 as number five. The sixth packet to be received by the Receiving Agent 18 is bar segment 100 representing flow 2;2. The sequence counter 88 will number flow 2;2 as number six. The seventh packet to be received by the Receiving Agent 18 is bar segment 102 representing flow 5;1. The sequence counter 88 will number flow 5;1 as number seven. Finally, the eighth packet to be received by the Receiving Agent 18 is bar segment 104 representing flow 1;3. The sequence counter 88 will number flow 1;3 as number eight.

Since packets are of arbitrary size, it is possible for many small packets to be received on one Data Link at the same time that a single or large packet is received on another Data Link. In this case, the large packet would have a sequence number N, while the small packets on the other Data Link would have sequence numbers N+1, N+2, N+3, N+4, etc. When moving data from the RLQs to the RQ, it is desirable to move this data at similar rates (from each RLQ to the RQ) independent of the size of the packets being received on the Receive Data Links. Alternating packet movement between RLQs would not achieve this goal due to the potential for different sized receive packets. Moving packets in order of sequence number achieves this goal.

Returning now to FIG. 4, the numbering of the packets by the sequence counter 88 of the Receiving Agent 18 as outlined with respect to FIG. 5 will be implemented. First, flow 1;1 from memory 53 of TLQA 51 was numbered one by the sequence counter 88 and is placed in memory 72 (i.e. the first memory) of Receiving Queue 70. Next, flow 2;1 from memory 63 of RLQB 61 was numbered two by the sequence counter 88 and is placed in memory 74 (i.e. the second memory) of Receiving Queue 70. Next, flow 3;1 from memory 65 of RLQB 61 was numbered three by the sequence counter 88 and is placed in memory 76 of Receiving Queue 70. Next, flow 1;2 from memory 55 of RLQA 51 was numbered four by the sequence counter 88 and is placed in memory 78 of Receiving Queue 70. Next, flow 4;1 from memory 57 of RLQA 51 was numbered five by the sequence counter 88 and is placed in memory 80 of Receiving Queue 70. Next, flow 2;2 from memory 67 of RLQB 61 was numbered six by the sequence counter 88 and is placed in memory 82 of Receiving Queue 70. Next, flow 5;1 from memory 69 of RLQB 61 was numbered seven by the sequence counter 88 and is placed in memory 84 of Receiving Queue 70. Finally, flow 1;3 from memory 59 of RLQA 51 was numbered eight by the sequence counter 88 and is placed in memory 86 of Receiving Queue 70. Note that memories 53, 55, 57, 59, 63, 65, 67 and 69 of RLQA 51 and RLQB 61 correspond in capability to memories 52, 54, 56, 58, 62, 64, 66 and 68 of TLQA 50 and TLQB 60.

Now, in order to comply with the second rule, the Receiving Agent 18 processes the packets in the sequential order shown in receive queue 70. The process outlined with respect to FIGS. 4 and 5 is repeated as memories become available in RLQA 51, RLQB 61, and Receiving Queue 70 while data is being exchanged.

Note that a Receiving Agent 18 moves its received packets from the Receive Link Queues (51, 61) to the Receiving Queue 70 as reception is complete in the order of the sequence numbers applied by Sequencer 88. The memories associated with the Receive Link Queues are provided to buffer their operation.

It is important to note that through the application of the pair of operating rules in the example illustrated with respect to FIG. 4, the order of Order Critical Flows 1 and 2 are not disrupted. Consequently, the present invention provides an apparatus for and a method of data exchange that exhibits improved data exchange system bandwidth and exceptional data exchange system bandwidth allocation.

Note that while multiple Order Critical Flows were shown interlaced in the example, interweaving Non-Order Critical Flows would be trivial as each could be thought of as a single-packet Order Critical Flow in these examples.

While illustrative embodiments and applications of this invention have been shown and described, it would be apparent to those skilled in the art that many more modifications than have been mentioned above are possible without departing from the inventive concepts set forth herein. The invention, therefore, is not to be limited except in the spirit of the appended claims.

What is claimed is:

1. A data communications system, comprising:
   a transmitting agent having a transmit queue including data to be transmitted and a first and second transmit link queue;
   a receiving agent having a receive queue for receiving said data and a first and second receive link queue;
   a first data link coupling said first receive link queue to said first transmit link queue;
   a second data link coupling said second receive link queue to said second transmit link queue;
   means for moving said data from said transmit queue to one of said first and second transmit link queues prior to transmission of said data over said first and second data links;
   means for determining if any of said data belongs to an order critical flow;
   means for directing all of said data belonging to a particular order critical flow over a selected one of said first and second data links.

2. A data communications system according to claim 1, wherein said transmit queue includes a plurality of packet memories for storing said data in the form of packets.

3. A data communications system according to claim 2, wherein said transmit link queues are coupled to said transmit queue and each said transmit link queue includes a plurality of packet memories for storing data in the form of packets.

4. A data communications system according to claim 3, wherein at least one of said first and second data links includes a crossbar.

5. A data communications system according to claim 3, wherein each of said first and second data links include a crossbar.

6. A data communications system according to claim 5, wherein said receiving agent includes a sequence counter for generating packet sequence numbers and further comprising means for sequentially numbering packets received at said first and second receive link queues in the order in which they begin to be received.

7. A data communications system according to claim 6, wherein said first and second receive link queues each include a plurality of packet memories for storing data received over said respective first and second data links in the form of packets.

8. A data communications system according to claim 7, wherein said receive queue includes a plurality of packet memories for storing data received from said first and second receive link queues in the form of packets.

9. A method of transmitting a stream of packets including at least one Order Critical Flow of packets from a transmitting agent to a receiving agent linked by a plurality of data links, said method preserving the order of the Order Critical Flow of packets, said method comprising the steps of:

applying the stream of packets to a transmit queue of the transmitting agent;

determining if a packet next in order for transmission within the transmit queue is part of an Order Critical Flow of packets;

transmitting said packet next in order over a selected one of the data links, said selected one corresponding to the data link used by the last packet belonging to the same Order Critical Flow if any packets from said Order Critical Flow of packets remain in the transmitting agent.

10. A method in accordance with claim 9, further comprising the steps of:

receiving said packet next in order at the receiving agent; and assigning said packet a sequence number based upon the order of the start of receipt by the receiving agent; and reassembling packets received at the receiving agent in an order preserving the order of Order Critical Flows of packets.

11. An apparatus for transmitting a stream of packets including at least one Order Critical Flow of packets from a transmitting agent to a receiving agent linked by a plurality of data links, wherein the order of the Order Critical Flow of packets is preserved, the apparatus comprising:

means for applying the stream of packets to a transmit queue of the transmitting agent;

means for determining if a packet next in order for transmission within the transmit queue is part of an Order Critical Flow of packets; and means for transmitting the packet next in order over a selected one of the data links, the selected one corresponding to the data link used by the last packet belonging to the same Order Critical Flow if any packets from the Order Critical Flow of packets remain in the transmitting agent.

12. The apparatus as defined in claim 11, further comprising:

means for receiving the packet next in order at the receiving agent;

means for assigning the packet a sequence number based upon the order of the start of receipt by the receiving agent; and means for reassembling packets received at the receiving agent in an order preserving the order of Order Critical Flows of packets.

13. A program storage device readable by a machine, tangibly embodying a program of instructions executable by the machine to perform a method for transmitting a stream of packets including at least one Order Critical Flow of packets from a transmitting agent to a receiving agent linked by a plurality of data links, wherein the order of the Order Critical Flow of packets is preserved, the method comprising:

applying the stream of packets to a transmit queue of the transmitting agent;

determining if a packet next in order for transmission within the transmit queue is part of an Order Critical Flow of packets; and transmitting the packet next in order over a selected one of the data links, the selected one corresponding to the data link used by the last packet belonging to the same Order Critical Flow if any packets from the Order Critical Flow of packets remain in the transmitting agent.

14. The program storage device as defined in claim 13, wherein the method further comprises:

receiving the packet next in order at the receiving agent;

assigning the packet a sequence number based upon the order of the start of receipt by the receiving agent; and reassembling packets received at the receiving agent in an order preserving the order of Order Critical Flows of packets.

* * * * *